US009892462B1

(12) United States Patent  (10) Patent No.: US 9,892,462 B1
Ross et al.  (45) Date of Patent: Feb. 13, 2018

(54) HEURISTIC MODEL FOR IMPROVING THE UNDERWRITING PROCESS

(71) Applicant: MASSACHUSETTS MUTUAL LIFE INSURANCE COMPANY, Springfield, MA (US)

(72) Inventors: Gareth Ross, Amherst, MA (US); Tricia Walker, West Hampton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 470 days.

(21) Appl. No.: 14/576,836

(22) Filed: Dec. 19, 2014

Related U.S. Application Data

(60) Provisional application No. 61/920,104, filed on Dec. 23, 2013.

(51) Int. Cl.
*G06Q 40/08* (2012.01)
(52) U.S. Cl.
CPC .................................. *G06Q 40/08* (2013.01)
(58) Field of Classification Search
CPC ..................................................... G06Q 40/08
USPC .............................................................. 705/4
See application file for complete search history.

(56) References Cited

U.S. PATENT DOCUMENTS

| | | | | |
|---|---|---|---|---|
| 7,287,008 B1* | 10/2007 | Mahoney | ............... | G06Q 40/00 705/35 |
| 7,831,451 B1* | 11/2010 | Morse | ................... | G06Q 10/10 705/2 |
| 7,895,062 B2* | 2/2011 | Bonissone | ............. | G06Q 10/10 705/2 |
| 7,899,688 B2* | 3/2011 | Bonissone | ............. | G06Q 10/10 705/2 |
| 8,515,783 B1* | 8/2013 | Weeks | ............... | G06Q 10/0635 705/4 |
| 8,793,146 B2* | 7/2014 | Bonissone | ............. | G06Q 10/10 705/4 |
| 2002/0116309 A1* | 8/2002 | Keyes | .................... | G06Q 40/04 705/36 R |
| 2003/0187700 A1* | 10/2003 | Bonissone | ............. | G06Q 40/00 705/4 |

(Continued)

FOREIGN PATENT DOCUMENTS

CA  2441810 A1  9/2001

OTHER PUBLICATIONS

Collins et al., "An Application of a Multiple Neural Network Learning System to Emulation of Mortgage Underwriting Judgements," Proceedings of the IEEE International Conference on Neural Networks, 1988, pp. II-459 through II-466.*

(Continued)

*Primary Examiner* — Eric T Wong
*Assistant Examiner* — Joshua D. Bradley
(74) *Attorney, Agent, or Firm* — Eric L. Sophir; Dentons US LLP (57) ABSTRACT

Systems and methods for automating best practices involved in the underwriting process are disclosed. A computer system performs a risk classification of a potential customer based on a set of factors, company's underwriting standards, and best practices gathered from top performing underwriters. The computer system is able to improve the quality of its output over time by learning from previous outcomes, updating underwriting standards, and updating best underwriting practices.

12 Claims, 5 Drawing Sheets

(56) References Cited

U.S. PATENT DOCUMENTS

| | | | |
|---|---|---|---|
| 2004/0128262 A1* | 7/2004 | Nafousi | G06Q 30/0283 705/400 |
| 2005/0108062 A1* | 5/2005 | Higgins | G06Q 40/08 705/4 |
| 2007/0016542 A1* | 1/2007 | Rosauer | G06N 5/022 706/21 |
| 2009/0299911 A1* | 12/2009 | Abrahams | G06Q 40/00 705/36 R |
| 2010/0017234 A1* | 1/2010 | Stephens | G06Q 40/08 705/4 |
| 2013/0332204 A1* | 12/2013 | Fiori | G06Q 40/08 705/4 |
| 2014/0108277 A1 | 4/2014 | Dresner et al. | |
| 2014/0195412 A1* | 7/2014 | Metz | G06Q 40/025 705/38 |
| 2015/0081319 A1* | 3/2015 | Kemp | G06Q 50/22 705/2 |

OTHER PUBLICATIONS

K. Aggour et al., "Automating the Underwriting of Insurance Applications," AI Magazine, 27, Fall 2006, pp. 36-50.*

P. Bonissone et al., "Evolutionary Optimization of Fuzzy Decision Systems for Automated Insurance Underwriting," Proc. FUZZ-IEEE 2002, Honolulu, HI, May 2002, pp. 1003-1008.*

W. Yan et al., "Designing a Neural Network Decision System for Automated Insurance Underwriting," 2006 International Joint Conference on Neural Networks, Jul. 2006, pp. 2106-2113.*

* cited by examiner

HEURISTIC MODEL FOR IMPROVING THE UNDERWRITING PROCESS

CROSS-REFERENCE TO RELATED APPLICATIONS

This application claims the benefit of the filing date of the U.S. Provisional Application No. 61/920,104, entitled "Heuristic Model For Improving The Underwriting Process," filed on Dec. 23, 2013, which is incorporated herein by reference in its entirety.

This application relates to U.S. Provisional Patent Application Ser. No. 61/920,098, filed Dec. 23, 2013, and U.S. Provisional Patent Application No. 61/920,110, filed on Dec. 23, 2013, which are hereby incorporated by reference in their entirety.

FIELD OF THE INVENTION

The present disclosure relates generally to a process for underwriting applications, and more particularly, to a heuristic algorithm for automating best practices involved in the underwriting process.

BACKGROUND

Through the underwriting process, financial institutions trade a risk of loss in exchange for the payment of a premium. In order to determine the amount of the premium, a risk analysis is performed so that the financial institution decides whether to accept or decline a potential customer. Additionally, the risk analysis assists in setting a competitive and profitable price plan to the customer.

Currently, the underwriting process is described almost entirely as a manual process. Trained individuals, or underwriters, traditionally perform the underwriting process. The underwriting process can be very time-consuming and involves the analysis of a plurality of underwriting standards set by a financial institution. Furthermore, the underwriting process may be biased by the judgment of the underwriter. Variation in factors such as underwriter training, experience, and quality of previous assessments can cause different underwriters to perform different determinations and decisions. As a result, there can be a large amount of variability and inconsistencies in the insurance underwriting process.

For the forgoing reasons, there is a need to improve accuracy, speed, consistency, and gather best practices involved in the underwriting process.

SUMMARY

The present disclosure is directed to a method for automating best practices involved in an underwriting process. An underwriting system gathers a company's underwriting standards and best practices from top performing underwriters. The underwriting system offers solutions in a fast, accurate and consistent manner. Furthermore, the underwriting system continually evolves by updating company's underwriting standards and best underwriting practices. In one embodiment, a computer executed method for automating an underwriting process is provided. The method includes retrieving, by a heuristic module of a server, a set of factors associated with a potential customer from one or more data sources and calculating, by the heuristic module, a risk score for each factor in the set of factors. The method further includes classifying, by the heuristic module, the potential customer into a risk category by executing a statistical learning technique that emulates resolution patterns of top performing underwriters, and assessing, by the heuristic module, a premium for the potential customer based on the corresponding risk category.

According to an embodiment, the underwriting system includes one or more client computing devices in communication with an underwriting platform through a network connection. Said underwriting platform is coupled to a database storing relevant data associated with potential customers.

In this embodiment, the underwriting platform includes a data extraction model, a risk analysis module and an output interface. Further to this embodiment, the data extraction module retrieves information regarding a set of factors related with an underwriting application stored in the database. In some embodiments, the data retrieved includes customers' information regarding a set of factors such as age, current health, financial condition, and the like. In one or more embodiments, the risk analysis module performs a risk classification and a premium assessment based on the data retrieved and also based on a set of rules defined by a company. A computing device presents the results to the user by displaying an output interface.

According to an embodiment, the risk analysis module evaluates a set of factors retrieved by the data extraction module. Depending on the value of each factor, the risk analysis module classifies the potential customer into a risk category. Based on the risk category, the risk analysis module performs a risk classification and a premium assessment.

In yet another embodiment, the risk analysis module evaluates a set of factors retrieved by the data extraction module. The risk analysis module calculates a risk score for each factor. Then, the underwriting decision heuristic calculates a risk of loss associated with a potential customer. Based on the risk of loss, the risk analysis module performs a risk classification and a premium assessment.

In some embodiments, the risk analysis module emulates the resolution of top performing underwriters using statistical learning techniques such as support vector machine and logistic regression. These techniques assume a linear or nonlinear relationship between factors and risk classes. Additionally, other techniques within the field of artificial intelligence may be employed such as expert systems and fuzzy logic. The different techniques employed by risk analysis module are based on the underwriting standards set by a company and best practices derived from top performing underwriters within the company.

In one embodiment, a computer-implemented method comprises retrieving, by a heuristic module of a server, a set of factors associated with a potential customer from at least one database; calculating, by the heuristic module of the server, a risk score for each factor in the set of factors; executing, by the heuristic module of the server, a statistical learning technique that emulates resolution patterns of a pre-determined set of underwriters to assess each risk score for each factor in the set of factors for the potential customer and classify the potential customer into a risk category; and calculating, by the heuristic module of the server, a premium for the potential customer based on the corresponding risk category.

In another embodiment, a system comprises a computer readable memory having stored thereon a computer-executable heuristic module; and a processor coupled to the memory, the processor executing the instructions via the heuristic module, the instructions including: retrieving a set of factors associated with a potential customer from at least one database; calculating a risk score for each factor in the set of factors; executing a statistical learning technique that emulates resolution patterns of a pre-determined set of underwriters to assess each risk score for each factor in the set of factors for the potential customer and classify the potential customer into a risk category; and calculating a premium for the potential customer based on the corresponding risk category.

In yet another embodiment, a non-transitory computer readable medium having stored thereon a computer executable heuristic module that when executed by a processor performs a method comprises retrieving, by the heuristic module, a set of factors associated with a potential customer from at least one database; calculating, by the heuristic module, a risk score for each factor in the set of factors; executing, by the heuristic module, a statistical learning technique that emulates resolution patterns of a pre-determined set of underwriters to assess each risk score for each factor in the set of factors for the potential customer and classify the potential customer into a risk category; and calculating, by the heuristic module, a premium for the potential customer based on the corresponding risk category.

Numerous other aspects, features and benefits of the present disclosure may be made apparent from the following detailed description taken together with the drawing figures.

BRIEF DESCRIPTION OF THE DRAWINGS

Non-limiting embodiments of the present invention are described by way of example with reference to the accompanying figures which are schematic and are not intended to be drawn to scale. Unless indicated as representing the background art, the figures represent aspects of the invention.

DETAILED DESCRIPTION

As used here, the following terms may have the following definitions:

"Premium" refers to a periodic payment that a customer offers to a financial institution.

"Underwriting process" refers to the assessment of a risk associated with a potential customer. It defines the risk that a financial institution may accept in exchange for the payment of a premium.

"Underwriting platform" refers to a software where data may be sorted, processed and analyzed by a set of application tools to provide insightful advice to the user.

"Factor" refers to information which can be used as a reference for measuring the risk associated with a potential customer. A factor may be information such as age, body mass index, blood pressure, current health, occupation, and the like.

"Risk analysis module" refers to an algorithm which measures the risk of a potential customer. Risk analysis module can set a premium based on company's standards and best underwriting practices gathered from top performing underwriters.

"Risk score" refers to a measure which describes the risk associated with a factor.

"Risk of loss" refers to a measure which describes the risk associated with a potential customer based on the analysis of a set of factors.

"Risk class" refers to a class which describes a level of risk. A premium may be associated with a risk class.

"Risk classification" refers to a method which classify a potential customer into a risk category.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Figure 1:
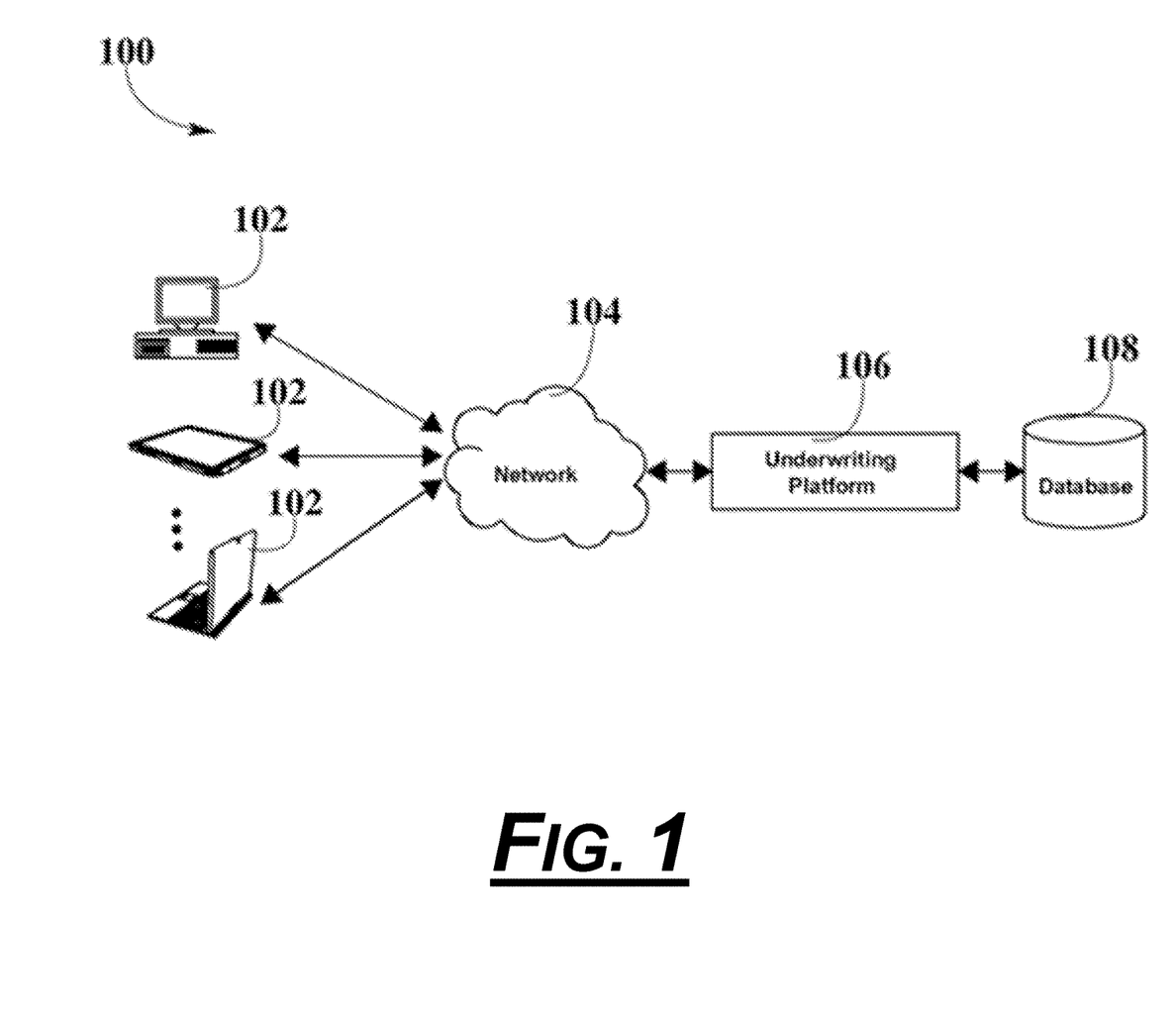
FIG. 1 is an exemplary system architecture for automated underwriting of potential customers, according to an embodiment

FIG. 1 is an exemplary system architecture 100 for automated underwriting of potential customers. System architecture 100 includes one or more client computing devices 102, network connection 104, underwriting platform 106, and one or more databases 108.

The computing code running in system architecture 100 includes programs designed and built to perform automated underwriting. Said computing code, processes multiple elements simultaneously in multi-processor environments. This allows performing large work such as heavy calculations and time consuming analysis in a more efficient manner than other approaches such as manual work performed by humans or approaches relying on a single computer. As will become apparent, functions and operations of system architecture 100 are sufficiently complex as to require implementation on a computer system, and cannot be performed in the human mind simply by mental steps.

In one embodiment, the aforementioned computing code is suited for processing multiple elements simultaneously to solve a problem in multi-processor environments. In this embodiment, client computing devices 102 for executing the computing codes, includes a single computer with multiple processors, several networked computers, specialized hardware, or any combination of the aforementioned elements. Further to this embodiment, multi-processor environments include various architectures such as multi-core chips, clusters, field-programmable gate arrays (FPGAs), digital signal processing chips and/or graphical processing units (GPUs). To this end, the computing code is parallelized for execution in a multi-processor environment including any number or combination of the above listed architecture types. The instruction sets, suitable for parallel execution generated from the computing code, allow multiple threads of computing code to be executed concurrently by the various computing elements in the multi-processor environment.

In FIG. 1, client computing devices 102 are operatively coupled to and in bi-directional communication with network connection 104. Network connection 104 is operatively coupled to and in bi-directional communication with underwriting platform 106. Underwriting platform 106 is operatively coupled to and in bi-directional communication with database 108

In FIG. 1, client computing devices 102 include smartphones, desktop computers, laptop computers, servers, tablets, PDAs, single computer with multiple processors, several networked computers, specialized hardware, and the like. Client computing devices 102 are used by an agent to perform duties associated with underwriting. An agent refers to any underwriting specialist.

In FIG. 1, network connection 104 is implemented as any type of hardware, software, and/or firmware that interconnect and otherwise couple computing devices to allow effective communication between the aforementioned computing devices. Examples of network connections 104 include intranets, local area networks (LANs), virtual private networks (VPNs), wide area networks (WANs), the Internet, and the like.

In FIG. 1, underwriting platform 106 is a collection of components that interact with each other in order to accept requests from agents and give responses accordingly. Underwriting platform 106 additionally includes programming running to serve the requests of other programs, the client programs. Thus, the server performs some tasks on behalf of client programs. Examples of client programs running on underwriting platform 106 include programs designed and built to store potential customer data, analyze the customer data, perform risk assessment related to a potential customer, calculate a premium based on said risk assessment and provide feedback to an agent through client computing devices 102.

Database 108 is implemented as a relational database that stores information about both the data and how it is related. In these embodiments, database 108 is implemented as conventional database management systems (DBMS), such as, MySQL, PostgreSQL, SQLite, Microsoft SQL Server, Microsoft Access, Oracle, SAP, dBASE, FoxPro, IBM DB2, LibreOffice Base, FileMaker Pro, MongoDb and/or any other type of database that may organize collections of data.

In one embodiment, data stored in database 108 includes customers' information regarding a set of factors such as age, current health, financial condition, and the like. The customers' information is used as for automated underwriting, where automated underwriting includes but is not limited to risk assessment related to a potential customer and premium calculation based on said risk assessment.

In exemplary operation, client computing devices 102 allows an agent to request for an underwriting analysis related to a potential customer. Upon the agent's request, underwriting platform 106 retrieves data related to the potential customer such as, age, current health, financial condition, and the like. Next, underwriting platform 106 performs a risk assessment of the customer and determines the premium of the product offered to the potential customer. Afterwards, the results are presented to the agent through client computing devices 102.

Figure 2:
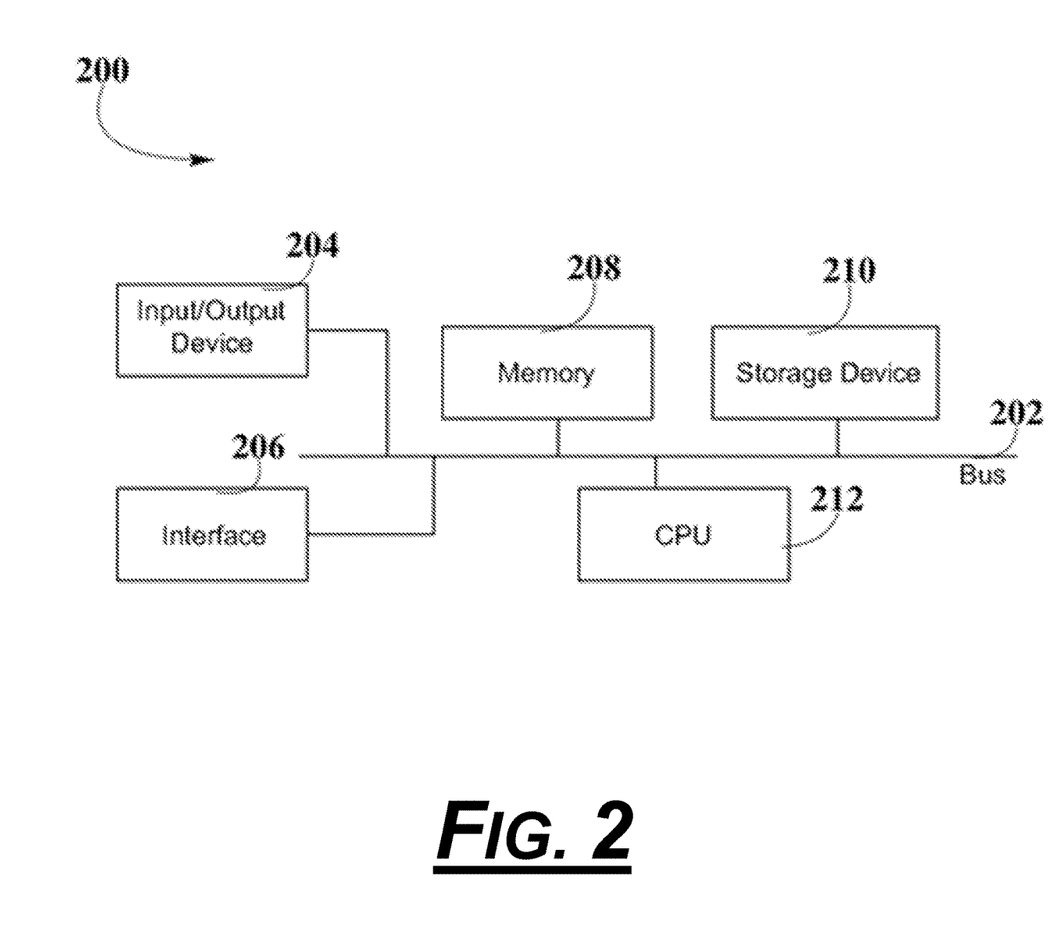
FIG. 2 is an exemplary computing device or server in which one or more embodiments of the present disclosure operate, according to an embodiment.

FIG. 2 is an exemplary computing device 200 or server in which one or more embodiments of the implementation operate, according to an embodiment. In one embodiment, computing device 200 includes bus 202, input/output (I/O) device 204, communication interface 206, memory 208, storage device 210 and central processing unit 212. In another embodiment, computing device 200 includes additional, fewer, different, or differently arranged components than those illustrated in FIG. 2.

In FIG. 2, bus 202 is in physical communication with (I/O) device 204, communication interface 206, memory 208, storage device 210, and central processing unit 212. Bus 202 includes a path that permits components within computing device 200 to communicate with each other.

Examples of (I/O) device 204 include peripherals and/or other mechanisms that may enable an examiner or candidate to input information to computing device 200, including a keyboard, computer mice, buttons, touch screens, touch-pad, voice recognition, biometric mechanisms, and the like. (I/O) device 204 also includes a mechanism that outputs information to the examiner or candidate using computing device 200, such as, a display, a microphone, a light emitting diode (LED), a printer, a speaker, orientation sensors, and the like. Said orientation sensors include one or more accelerometers, one or more gyroscopes, one or more compasses, and the like. The accelerometer provides a respective change of a respective angle about a respective axis. The gyroscope provides a respective rate of change of a respective angle about a respective axis and the compass provides a compass heading.

Examples of communication interface 206 include mechanisms that enable computing device 200 to communicate with other computing devices and/or systems through network connections. Examples of memory 208 include random access memory 208 (RAM), read-only memory (ROM), flash memory, and the like. Examples of storage device 210 include magnetic and/or optical recording medium, ferro-electric RAM (F-RAM) hard disks, solid-state drives, floppy disks, optical discs, and the like. In one embodiment, memory 208 and storage device 210 store information and instructions for execution by central processing unit 212. In another embodiment, central processing unit 212 includes a microprocessor, an application specific integrated circuit (ASIC), or a field programmable object array (FPOA), and the like. In this embodiment, central processing unit 212 interprets and executes instructions retrieved from memory 208 and storage device 210.

According to some aspects of this embodiment, computing device 200 is implemented as part of a server, client computing devices 102, or other components of system architecture 100. Examples of these implementations include servers, authorized computing devices, smartphones, desktop computers, laptop computers, tablet computers, PDAs, another type of processor-controlled device that receive, process, transmit digital data, and the like. Additionally, computing device 200 performs certain operations that are required for the proper operation of the systems and methods described herein. Computing devices 200 perform these operations in response to central processing unit 212 executing software instructions contained in a computer-readable medium, such as memory 208.

In one embodiment, the software instructions of the system are read into memory 208 from another memory location, such as storage device 210, or from another computing device 200 (e.g., client computing devices 102, and the like) via communication interface 206. In this embodiment, the software instructions contained within memory 208 cause central processing unit 212 to perform processes that will be described below in FIGS. 3-5.

Figure 3:
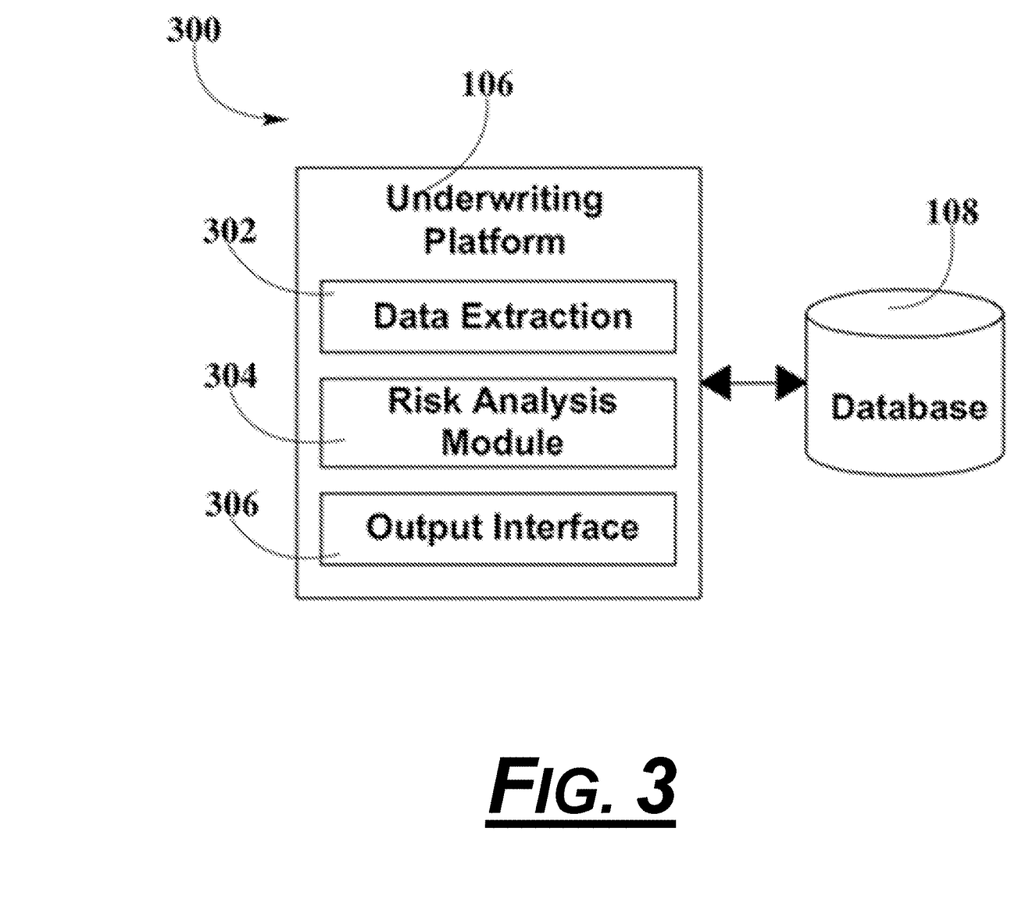
FIG. 3 is an exemplary block diagram of a sub-system of a portion of system architecture pertaining to an underwriting platform.

FIG. 3 is an exemplary block diagram of a subsystem 300 of a portion of system architecture 100 pertaining to underwriting platform 106. In one embodiment, underwriting platform 106 further includes data extraction module 302, risk analysis module 304, and output interface 306. Although underwriting platform 106 includes the listed components, it should be understood that underwriting platform 106 can include less components, more components, or different components depending on the desired analysis goals. In FIG. 3, underwriting platform 106 is operatively coupled and in bi-directional communication with database 108.

In one embodiment, underwriting platform 106 is implemented as one or more computer software modules that include programmatic rules or logic for analyzing data and underwriting potential customers. In this embodiment, data extraction module 302 retrieves data related to the potential customer from database 108. Said data is then analyzed by risk analysis module 304 which performs a risk assessment of the potential customer and provides insight for setting the premium of the product offered to the customer. Further to this embodiment, output interface 306 presents the results derived from risk analysis module 304 to client computing device 102, where client computing device 102 previously requested an underwriting analysis associated with a potential customer.

Data extraction module 302 is configured to retrieve data regarding a potential customer, where said data is stored in database 108. The data includes information regarding a set of factors such as age, sex, current health/physical condition, personal health history, family health history, financial condition, occupation, or hobbies, and the like. Next, data extraction module 302 feeds risk analysis module 304 with the data retrieved.

Risk analysis module 304 is configured to perform a risk assessment of a potential customer based on a set of underwriting rules defined by a financial institution. Based on said risk assessment, Risk analysis module 304 determines the premium a potential customer should pay in case of acquiring the product offering. Additionally, Risk analysis module 304 is able to reject a potential customer based on the aforementioned risk assessment.

Output interface 306 provides mechanisms that enable client computing devices 102 to communicate with agents requesting an underwriting analysis regarding a potential customer. Output interface 306 presents instructions or results based on data derived from Risk analysis module 304.

In exemplary operation, given an underwriting request data extraction module 302 retrieves information related to a potential customer such as age, current health, financial condition, and the like. Next, risk analysis module 304 performs a risk assessment of the customer and determines the premium of the product offered to the potential customer. Afterwards, output interface 306 presents the results derived from risk analysis module 304 to an agent through client computing device 102.

A plurality of methods implemented by the underwriting platform are performed by one or more computing devices such as computing device 200. The methods are implemented with components of the exemplary operating environments of FIGS. 1-3. The steps of this exemplary method are embodied in a computer readable medium containing a computer readable code such that the steps are implemented when the computer readable code is executed by a computing device. While the blocks in the disclosed process are shown in a particular order, the actual order may differ. In some embodiments, some steps are performed in parallel.

Figure 4:
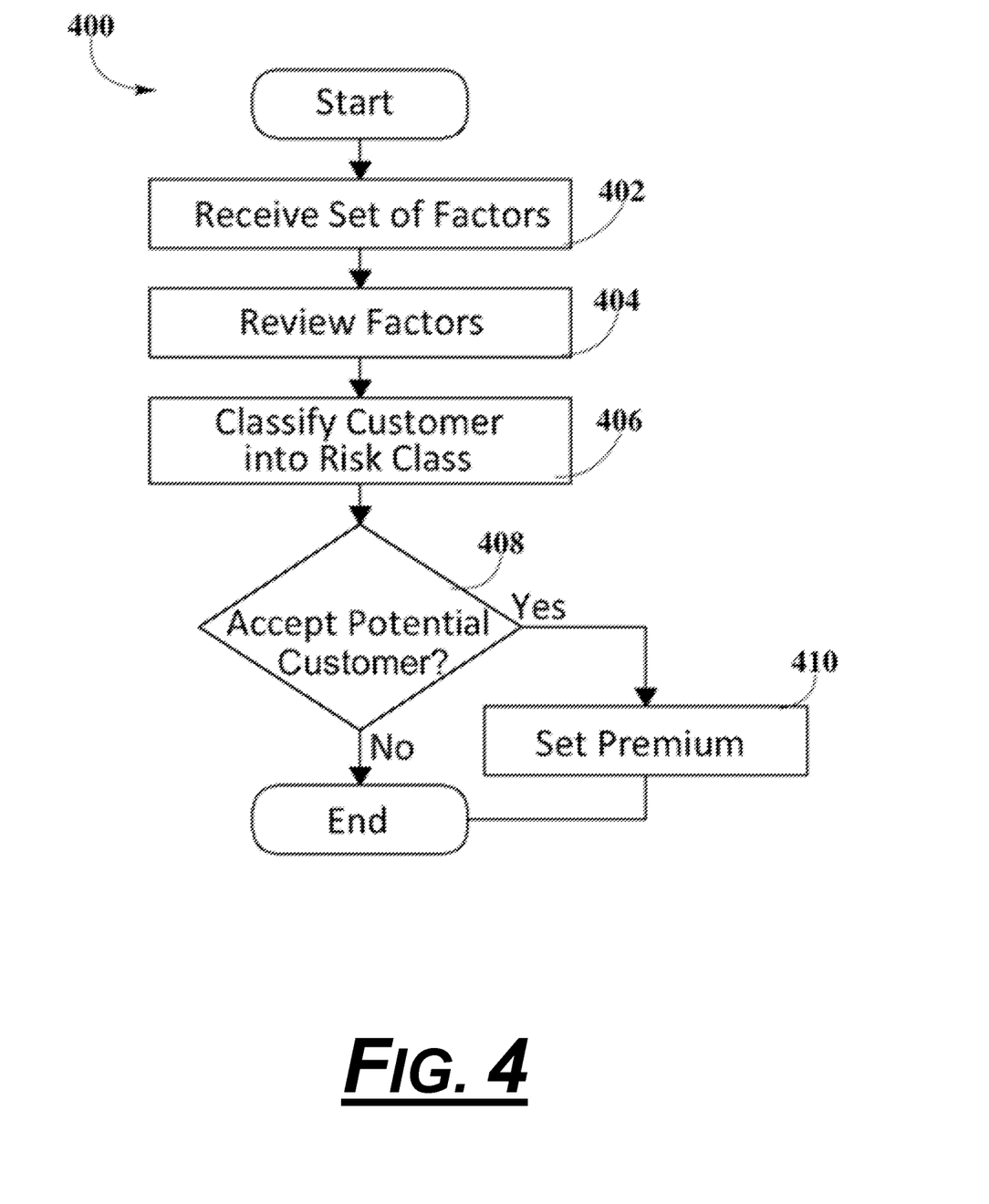
FIG. 4 is a first embodiment of a flow diagram for a risk classification method, according to another embodiment.

FIG. 4 is a flow diagram generally illustrating an exemplary method 400 for analyzing a set of factors related to a potential customer and performing a risk classification of said potential customer into a risk class. The steps of the method are implemented with components of the exemplary operating environments of FIGS. 1-3. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 4 the process begins at step 402, where a risk analysis module receives a set of factors from a data extraction module. In one embodiment, the set of factors includes information such as age, body mass index, blood pressure, current health, occupation, and the like. Method 400 then advances to step 404.

At step 404, the risk analysis module reviews one or more factors included in the underwriting application. In one embodiment, said review includes comparing the value of each factor against one or more risk classes. In this embodiment, risk classes span within lower and upper bound values. Method 400 then advances to step 406.

At step 406, the risk analysis module classifies the potential customer into a risk class based on the value of each factor. Method 400 then advances to step 408.

At decision point 408, the risk analysis module determines to either accept or reject a potential customer based on the risk class of the potential customer. In case of accepting the potential customer, Method 400 then advances to step 410.

At step 410, the underwriting decision heuristic sets the premium for the potential customer.

In one embodiment, the risk analysis module emulates the resolution patterns of top performing underwriters by using statistical learning techniques such as support vector machine and logistic regression. In one or more embodiments, the aforementioned techniques assume either a linear or nonlinear relationship between factors and risk classes. In some embodiments, a nonlinear relationship between factors and risk classes is preferred. Other techniques within the space of artificial intelligence can be employed, such as expert systems and fuzzy logic, and the like. Further to these embodiments, the aforementioned techniques operate based on a defined set of underwriting standards set by the company, potentially enhanced with third party data, as well as best practices derived from the top performing underwriters within the company. In some embodiments, the risk analysis module provides a resolution which may be a risk classification or a risk of loss assessment.

In one embodiment, the company periodically updates its underwriting standards and best underwriting practices so that underwriting platform keeps improving the quality of its output over time.

In an example and referring to FIG. 3, data extraction module 302 retrieves relevant data, such as age, current health, and financial condition, regarding an annuity plan application. Next, data extraction module 302 passes said data to risk analysis module 304. Based on the data retrieved, the company's standards and best practices gathered from top performing employees, risk analysis module 304 classifies a potential customer into a risk category and thus, determines the premium associated with the annuity plan application. In this example, the risk analysis model mimics the decision patterns of top performing employees by using artificial intelligence tools such as expert systems and fuzzy logic. Further to this example, a computing device presents the results derived from risk analysis module through an output interface.

Figure 5:
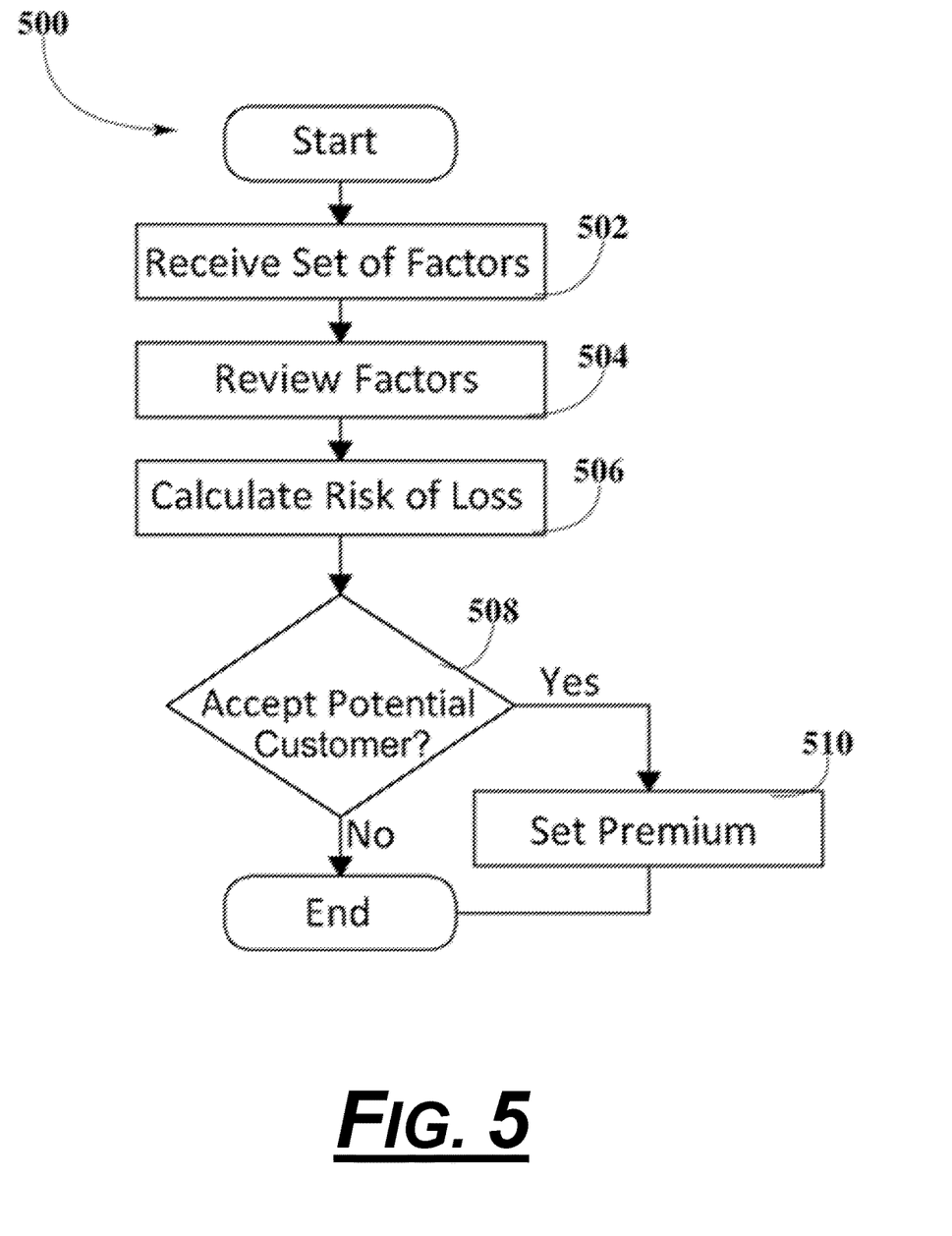
FIG. 5 is a second embodiment of a flow diagram for a risk classification method, according to another embodiment.

FIG. 5 is a flow diagram generally illustrating an exemplary method 500 for analyzing a set of factors related to a potential customer and calculating a risk of loss based on said set of factors. The steps of the method are implemented with components of the exemplary operating environments of FIGS. 1-3. The steps of this exemplary method are embodied in a computer readable medium containing a computer readable code such that the steps are implemented when the computer readable code is executed by a computing device. In some implementations, certain steps of the method can be combined, performed simultaneously, or in a different order, without deviating from the objective of the method.

In FIG. 5, the process starts at step 502, where risk analysis module receives a set of factors from data extraction module. In one embodiment, the set of factors includes information such as age, body mass index, blood pressure, current health, occupation, and the like. Method 500 then advances to step 504.

At step 504, a risk analysis module reviews one or more factors included in the underwriting application. In one embodiment, reviewing the one or more factors includes the risk analysis module calculating a risk score for each factor. Method 500 then advances to step 506.

At step 506, the risk analysis module calculates a risk of loss associated with a potential customer. In one embodiment, the risk of loss is calculated based on the risk score associated with each of the factors. Method 500 then advances to step 508.

At decision point 508, the risk analysis module determines to either accept or reject a potential customer based on the risk of loss associated with the potential customer. In case of accepting the potential customer, Method 500 then advances to step 510.

At step 510, the risk analysis module sets a premium according to the risk of loss associated with the potential customer.

By executing method 400 and method 500 through the exemplary operating environments shown in FIGS. 1-3, big data analytics and data mining techniques can be implemented for a more efficient and faster processing of larger data sets. In this way, efficiencies are created by providing ways to automatically underwrite potential customers while maintaining the company's quality standards in their process. These features allow performing large work such as heavy calculations and time consuming analysis in a more efficient manner than other approaches such as manual work performed by humans.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be used in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
    querying, by a server, a database comprising profile data of a plurality of underwriters to retrieve the profile data corresponding to each underwriter;
    ranking, by the server, the plurality of underwriters based on one or more attributes associated with the profile data of each underwriter,
        wherein the one or more attributes associated with the profile data of each underwriter comprises a number of cases and an education value associated with each underwriter;
    generating, by the server, a learning algorithm model using a support vector machine configured to emulate resolution patterns corresponding to processing of one or more previously-considered customers by one or more underwriters, the learning algorithm model receiving an input of a learning algorithm dataset based on profile data associated with one or more underwriters having a rank that satisfies a pre-determined threshold;
    iteratively updating, by the server, the learning algorithm dataset based on modified data associated with the one or more underwriters having the rank greater than the pre-determined threshold,
        wherein the learning algorithm dataset is adjusted, by the server, in an event that the server determines that the one or more attributes associated with the profile data of each underwriter from the one or more underwriters satisfying the pre-determined threshold has been modified, and
        wherein the server periodically queries the database to receive profile data of the one or more underwriters of the plurality of underwriters having the rank that satisfies the pre-determined threshold;
    generating, by the server, a graphical user interface configured to be displayed on a client computing device;
    receiving, by the server, via the graphical user interface, an application request comprising information associated with a potential customer;
    retrieving, by the server, a set of factors associated with the potential customer from the database;
    calculating, by the server, a risk score for each factor in the set of factors associated with the potential customer;
    executing, by the server, the learning algorithm model using the learning algorithm dataset to assess each risk score for each factor in the set of factors for the potential customer and classify the potential customer into a risk category;
    calculating, by the server, a premium value for the potential customer based on the corresponding risk category; and
    updating, by the server, the graphical user interface of the client computing device to display the premium value in response to the application request.

2. The method of claim 1, wherein each of the factors in the set of factors is selected from the group consisting of an age factor, a health condition factor, and a financial condition factor.

3. The method of claim 1, wherein the database includes an annuity plan.

4. The method of claim 1, wherein the database includes a business plan.

5. A system comprising:
    computer readable memory having stored thereon a computer-executable heuristic module; and
    a processor coupled to the memory, the processor executing instructions including:
        querying a database comprising profile data of a plurality of underwriters to retrieve the profile data corresponding to each underwriter;
        ranking, by the server, the plurality of underwriters based on one or more attributes associated with the profile data of each underwriter,
            wherein the one or more attributes associated with the profile data of each underwriter comprises a number of cases and an education value associated with each underwriter;
        generating, by the server, a learning algorithm model using a support vector machine configured to emulate resolution patterns corresponding to processing of one or more previously-considered customers by one or more underwriters, the learning algorithm model receiving an input of a learning algorithm dataset based on profile data associated with one or more underwriters having a rank that satisfies a pre-determined threshold;
        iteratively updating, by the server, the learning algorithm dataset based on modified data associated with the one or more underwriters having the rank greater than the pre-determined threshold,
            wherein the learning algorithm dataset is adjusted, by the server, in an event that the server determines that the one or more attributes associated with the profile data of each underwriter from the one or more underwriters satisfying the pre-determined threshold has been modified, and
            wherein the server periodically queries the database to receive profile data of the one or more underwriters of the plurality of underwriters having the rank that satisfies the pre-determined threshold;

generating, by the server, a graphical user interface configured to be displayed on a client computing device;

receiving, by the server, via the graphical user interface, an application request comprising information associated with a potential customer;

retrieving a set of factors associated with the potential customer from the database;

calculating a risk score for each factor in the set of factors associated with the potential customer;

executing the learning algorithm model using the learning algorithm dataset to assess each score for each risk factor in the set of factors for the potential customer and classify the potential customer into a risk category;

calculating a premium value for the potential customer based on the corresponding risk category; and updating the graphical user interface of the client computing device to display the premium value in response to the application request.

6. The system of claim 5, wherein each of the factors in the set of factors is selected from the group consisting of an age factor, a health condition factor, and a financial condition factor.

7. The system of claim 5, wherein the database includes an annuity plan.

8. The system of claim 5, wherein the database includes a business plan.

9. A non-transitory computer readable medium having stored thereon a computer executable module that when executed by a processor performs a method comprising:

querying, by a server, a database comprising profile data of a plurality of underwriters to retrieve the profile data corresponding to each underwriter;

ranking, by the server, the plurality of underwriters based on one or more attributes associated with the profile data of each underwriter, wherein the one or more attributes associated with the profile data of each underwriter comprises a number of cases and an education value associated with each underwriter;

generating, by the server, a learning algorithm model using a support vector machine configured to emulate resolution patterns corresponding to processing of one or more previously-considered customers by one or more underwriters, the learning algorithm model receiving an input of a learning algorithm dataset based on profile data associated with one or more underwriters having a rank that satisfies a pre-determined threshold;

iteratively updating, by the server, the learning algorithm dataset based on modified data associated with the one or more underwriters having the rank greater than the pre-determined threshold, wherein the learning algorithm dataset is adjusted, by the server, in an event that the server determines that the one or more attributes associated with the profile data of each underwriter from the one or more underwriters satisfying the pre-determined threshold has been modified, and wherein the server periodically queries the database to receive profile data of the one or more underwriters of the plurality of underwriters having the rank that satisfies the pre-determined threshold;

generating, by the server, a graphical user interface configured to be displayed on a client computing device;

receiving, by the server, via the graphical user interface, an application request comprising information associated with a potential customer;

retrieving, by the server, a set of factors associated with the potential customer from the database;

calculating, by the server, a risk score for each factor in the set of factors associated with the potential customer;

executing, by the server, the learning algorithm model using the learning algorithm dataset to assess each score for each risk factor in the set of factors for the potential customer and classify the potential customer into a risk category;

calculating, by the server, a premium value for the potential customer based on the corresponding risk category; and updating, by the server, the graphical user interface of the client computing device to display the premium value in response to the application request.

10. The computer readable medium of claim 9, wherein each of the factors in the set of factors is selected from the group consisting of an age factor, a health condition factor, and a financial condition factor.

11. The computer readable medium of claim 9, wherein the database includes an annuity plan.

12. The computer readable medium of claim 9, wherein the database includes a business plan.

* * * * *